US011851183B2

(12) United States Patent
Germe et al.

(10) Patent No.: US 11,851,183 B2
(45) Date of Patent: Dec. 26, 2023

(54) AIRCRAFT CABIN EQUIPPED WITH A SAFETY DEVICE AND ASSOCIATED PROCESS

(71) Applicant: DASSAULT AVIATION, Paris (FR)

(72) Inventors: Lionel Patrick Germe, Merignac (FR); Emmanuel Picut, Merignac (FR); Alain Levavasseur, Merignac (FR); Erwan Boulo, Merignac (FR); Jérémie Guerard, Merignac (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 17/077,684

(22) Filed: Oct. 22, 2020

(65) Prior Publication Data

US 2021/0122473 A1 Apr. 29, 2021

(30) Foreign Application Priority Data

Oct. 23, 2019 (FR) .................................. FR 19 11839

(51) Int. Cl.
*B64D 11/06* (2006.01)
*B64D 41/00* (2006.01)

(52) U.S. Cl.
CPC ...... *B64D 11/0621* (2014.12); *B64D 11/0601* (2014.12); *B64D 11/0605* (2014.12); *B64D 11/0638* (2014.12); *B64D 41/00* (2013.01); *B64D 2201/00* (2013.01)

(58) Field of Classification Search
CPC .......... B64D 11/06205; B64D 11/0621; B64D 2201/00; B60G 2800/92
See application file for complete search history.

(56) References Cited

U.S. PATENT DOCUMENTS

| 10,059,296 | B2 | 8/2018 | Farooq et al. |
| 10,239,620 | B2 | 3/2019 | Strobl et al. |
| 2005/0087650 | A1 | 4/2005 | Quan et al. |
| 2006/0202447 | A1 | 9/2006 | Sawada |
| 2009/0236828 | A1 | 9/2009 | Foubert et al. |
| 2010/0187357 | A1 | 7/2010 | Funke et al. |
| 2013/0106079 | A1 | 5/2013 | Jarboe et al. |
| 2014/0027574 | A1 | 1/2014 | Obadia et al. |

(Continued)

FOREIGN PATENT DOCUMENTS

CN 204821286 U * 12/2015
CN 108609189 A 10/2018

(Continued)

OTHER PUBLICATIONS

Search Report for priority application FR 1911839.

*Primary Examiner* — Philip J Bonzell
*Assistant Examiner* — Justin Michael Heston
(74) *Attorney, Agent, or Firm* — Davidson, Davidson & Kappel, LLC (57) ABSTRACT

An aircraft cabin includes at least one seat able to receive at least one passenger; at least one table arranged opposite the seat; and a safety device able to be mounted on the table, below the table or received in the table. The safety device includes a deployable protection assembly including an airbag deployable from a retracted idle configuration to a deployed safety configuration, and a system for controlling the deployment of the or each airbag, able to trigger the deployment of the airbag beyond a threshold deceleration value of the aircraft.

19 Claims, 13 Drawing Sheets

(56) References Cited

U.S. PATENT DOCUMENTS

| | | |
|---|---|---|
| 2015/0042078 A1 | 2/2015 | Gehret et al. |
| 2015/0151983 A1 | 6/2015 | McCluskey et al. |
| 2015/0284090 A1 | 10/2015 | Stephens et al. |
| 2017/0259772 A1* | 9/2017 | Farooq .................... B60N 2/14 |

FOREIGN PATENT DOCUMENTS

| | | | |
|---|---|---|---|
| DE | 19940984 A1 | 3/2001 | |
| EP | 2551196 A1 | 1/2013 | |
| FR | 2991941 A1 | 12/2013 | |
| JP | H11180398 A * | 7/1999 | ........... B60R 21/207 |
| WO | WO 2012/050587 A1 | 4/2012 | |
| WO | WO-2015008082 A2 * | 1/2015 | ............... B64C 1/18 |
| WO | WO-2017214519 A1 * | 12/2017 | ............. B60N 3/004 |
| WO | WO2017214519 A1 | 12/2017 | |

\* cited by examiner

AIRCRAFT CABIN EQUIPPED WITH A SAFETY DEVICE AND ASSOCIATED PROCESS

The present disclosure relates to an aircraft cabin comprising:

at least one seat able to receive at least one passenger;
at least one table arranged opposite the seat;
a safety device able to be mounted on the table, below the table or received in the table.

Such a cabin constitutes an arrangement on board an aircraft, more particularly a business plane, intended to improve passenger safety, while accelerating and simplifying the certification of the aircraft seats in the cabin.

BACKGROUND

In business planes, passenger seats can be arranged opposite a table making it possible to work and/or eat in flight. To ensure the safety of the passengers seated opposite the table during the taxi, takeoff and landing phases of the airplane (TTOL: Taxi Take Off Landing), foam protection pads, called crash pads, are arranged on the table. These pads minimize the risk of injuries to the passenger on the table, in case of sharp deceleration by the airplane (for example in case of emergency braking). The presence of this pad can constitute a requirement for the certification of the aircraft.

However, these protection pads have many drawbacks. They are bulky, and their storage in the closets of the hold requires significant space on board the aircraft. The commercial crew must further manipulate them at the beginning and the end of each flight phase (taxi, takeoff and landing), which is tedious and bothersome for the passengers, and adds work for the crew during the preparation of the cabin.

Lastly, the certification of increasingly comfortable seats on board airplanes, which are therefore increasingly heavy, requires more suitable safety solutions inasmuch as the seats face a table. This increases the number and duration of the tests to verify passenger protection to be conducted until the certification is obtained and therefore affects the schedules and construction costs for airplanes. Furthermore, the certification of more comfortable seats with a table kept in the high position may be uncertain without safety solutions.

For passenger comfort and satisfaction, the high table configuration is preferable throughout the entire flight.

One aim of the present disclosure is to provide an aircraft cabin layout including at least one seat, arranged opposite a table that may be kept in the high position at all times, in which the safety of the passenger present in the seat is improved during taxi, takeoff and landing phases, according to the certification requirements.

SUMMARY

The present disclosure relates to an aircraft cabin of the aforementioned type, characterized in that the safety device includes:

at least one deployable protection assembly including an airbag deployable from a retracted idle configuration to a deployed safety configuration of the or each passenger seated on the seat, and
a system for controlling the deployment of the or each airbag, able to trigger the deployment of the airbag beyond a threshold deceleration value of the aircraft.

The cabin according to the present disclosure may comprise one or more of the following features, considered alone or according to any technically possible combination(s):

the table includes a tray;
the deployable protection assembly is able to be mounted on the tray or received in the tray;
at least one deployable protection assembly is received in the thickness of the tray of the table;
at least one deployable protection assembly is mounted below the tray of the table;
the tray comprises a base and at least one flap that is movable relative to the base between a stowed configuration in which the flap is folded on the base and a usage configuration in which the flap is deployed in the extension of the base;
at least one deployable protection assembly is received in the thickness of the flap of the table;
the flap comprises a foam covering fixed on the flap, at least one deployable protection assembly being received in the foam covering;
the safety device includes a removable protection pad able to be mounted on the table, at least one deployable protection assembly being received in the protection pad; and
it comprises a first seat oriented in a normal movement direction of the aircraft, and a first deployable protection assembly mounted facing the first seat, the first deployable protection assembly comprising a first airbag deploying above the table in order to protect the torso and the head of a passenger seated in the first seat, the cabin comprising a second seat oriented in a direction opposite the normal movement direction of the aircraft and a second deployable protection assembly facing the second seat, the second deployable protection assembly comprising a second airbag deploying below the table to protect the lower limbs of a passenger seated in the second seat;
the second airbag deploys downward without protruding vertically above and opposite the tray;
the second airbag in the deployed configuration has a first region arranged below the tray, advantageously in contact with a lower surface of the tray and a second region arranged opposite a peripheral edge of the tray, advantageously in contact with the peripheral edge of the tray;
the second airbag in the deployed configuration has a bean shape;
the first airbag deploys upward, protruding vertically above and opposite the tray, advantageously without protruding vertically below and opposite the tray;
the table defines or bears a housing for receiving the safety device and includes a cover for closing the housing defining part of an outer surface of the table;
the safety device includes a case receiving the airbag and an inflation system for inflating the airbag;
the control system includes a battery able to supply electricity to the inflation system or the control system includes an electricity supply connection connected to an electrical supply system of the aircraft and to the inflation system;
the control system controlling the deployment of the airbag is received in the case;
the control system includes a deceleration detection device and a processor able to analyze deceleration measurements taken by the detection device in order to activate the deployment of the airbag when the deceleration measured by the detection device is above the threshold value; and the deployable protection assembly is mounted on the table at all times, below the table at all times, or is received in the table at all times;

the table is kept in a plane parallel to the cabin floor at all times;

the table is kept in the high position during the taxi, takeoff and landing phases of the aircraft;

the table comprises a tray, the tray comprises at least one base extending at all times in a plane parallel to a cabin floor, the plane of the base being horizontal when the longitudinal axis of the aircraft is horizontal;

in the high position, the base is arranged above and at a distance from a floor of the cabin;

the table is mounted on a floor of the cabin;

the table comprises at least one leg and a tray supported by the at least one leg;

the at least one leg is fixed on a floor of the cabin;

the table comprises a tray fixed on a sideledge of the cabin;

the table is arranged with no mechanical connection with the seat opposite which the table is arranged or with each seat opposite which the table is arranged;

the table is a dining or/and working table;

the table is without a mechanical connection to a seat of the cabin.

The present disclosure also relates to a method for protecting a passenger of an aircraft, comprising the following steps:

installing at least one passenger in a seat of an aircraft cabin as defined above;

detecting, via the control system, a deceleration of the aircraft exceeding a threshold deceleration value;

deploying the or each airbag in the space opposite the or each passenger, between the seat and the table.

The cabin according to the present disclosure may comprise one or more of the following features, considered alone or according to any technically possible combination(s):

keeping the table in a plane parallel to the cabin floor at all times;

keeping the table in the high position throughout the entire duration of the flight, in particular during the taxi, takeoff and landing phases of the aircraft.

BRIEF DESCRIPTION OF THE DRAWINGS

The present disclosure will be better understood upon reading the following description, provided solely as an example, and in reference to the appended drawings, in which.

DETAILED DESCRIPTION

FIGS. 1 to 4 illustrate a first aircraft 10 cabin 12 according to the present disclosure. The aircraft 10 is in particular a business jet. A "business jet" in particular refers to an airplane having a total mass at takeoff of less than 55,000 kg (121,000 pounds). A business jet is generally certified to transport fewer than 25 passengers, in particular fewer than 21 passengers.

Figure 1:
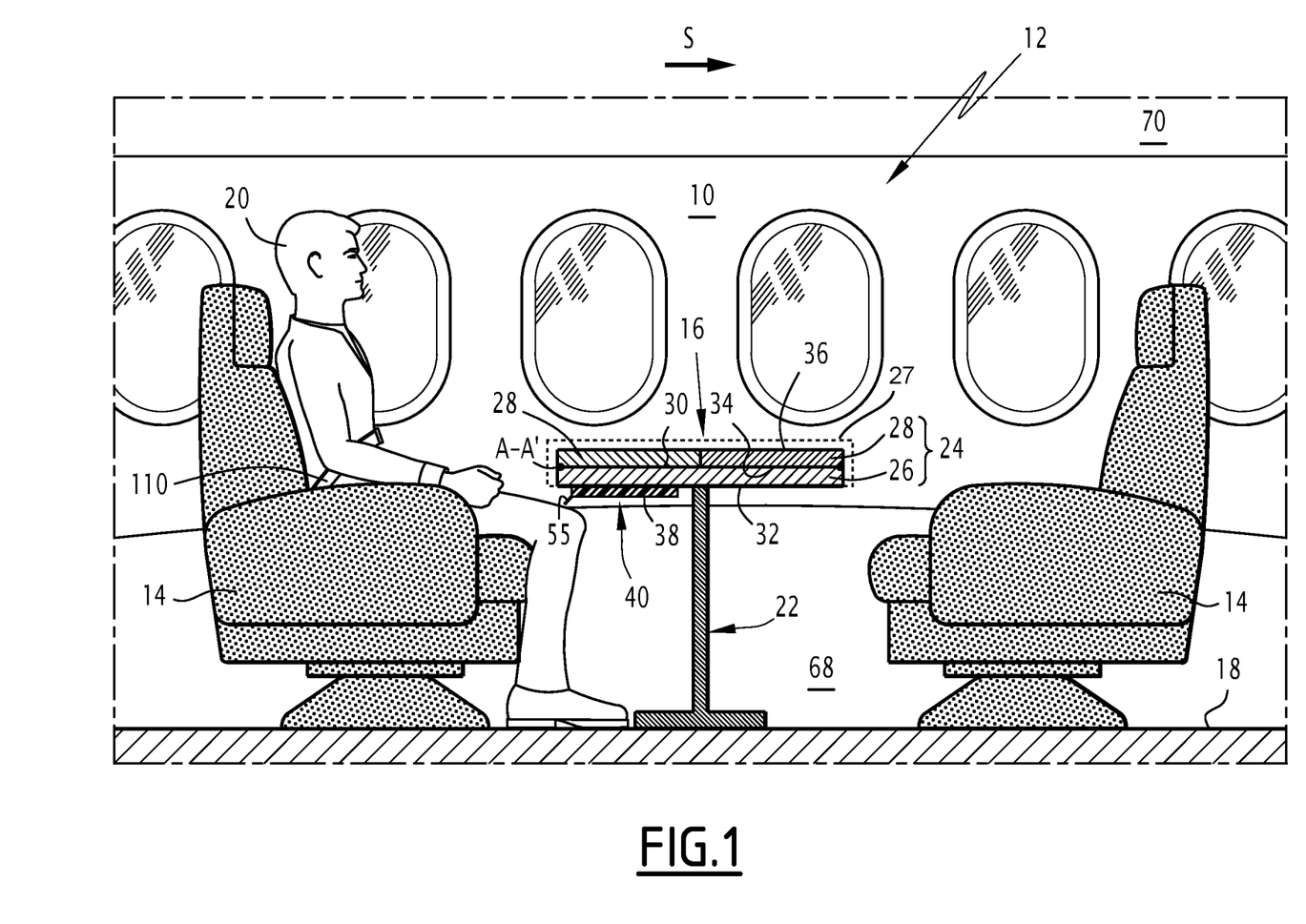
FIG. 1 is a partial longitudinal sectional view of a first aircraft cabin according to the present disclosure.

The cabin 12 of the aircraft 10 extends from the rear the aircraft 10 toward the front of the aircraft 10 along the normal movement direction of the aircraft along the arrow S. The cabin 12 includes at least one seat 14 and at least one table 16.

The cabin 12 further includes, opposite at least one seat 14 oriented in the direction S, a safety device 40, able to protect a passenger 20 seated in the seat 14 from an impact against the table 16, in case of abrupt deceleration of the aircraft. In the particular example of FIG. 1, two seats 14 are shown, located on either side of a table 16.

In this example, the seat 14 includes a seat bottom and a backrest able to receive a single passenger. In a variant, the seat 14 includes a seat bottom mounted on the floor of the aircraft and a backrest able to accommodate several passengers. In another variant, the seat 14 has a common seat bottom and several backrests, each backrest accommodating a passenger.

The seats 14 and the table 16 are mounted on the floor 18 of the aircraft 10.

In FIG. 1, a seat 14 accommodates a passenger 20. Each seat 14 is mounted opposite the table 16.

Each seat 14 includes a seatbelt 110. In the example shown in the figures, each seatbelt 110 is attached by two points to the seat 14 on which it is mounted. In particular, all of the belts 110 are lap belts that do not include shoulder straps.

In a variant that is not shown, at least one seatbelt 110 is attached by three points to the seat 14 on which it is mounted, and comprises a lap belt and a shoulder strap.

The table 16 is able to be used by the passenger 20 throughout the entire duration of the flight in order to work or dine, for example. It advantageously occupies a high usage position throughout the entire duration of the flight.

Figure 3:
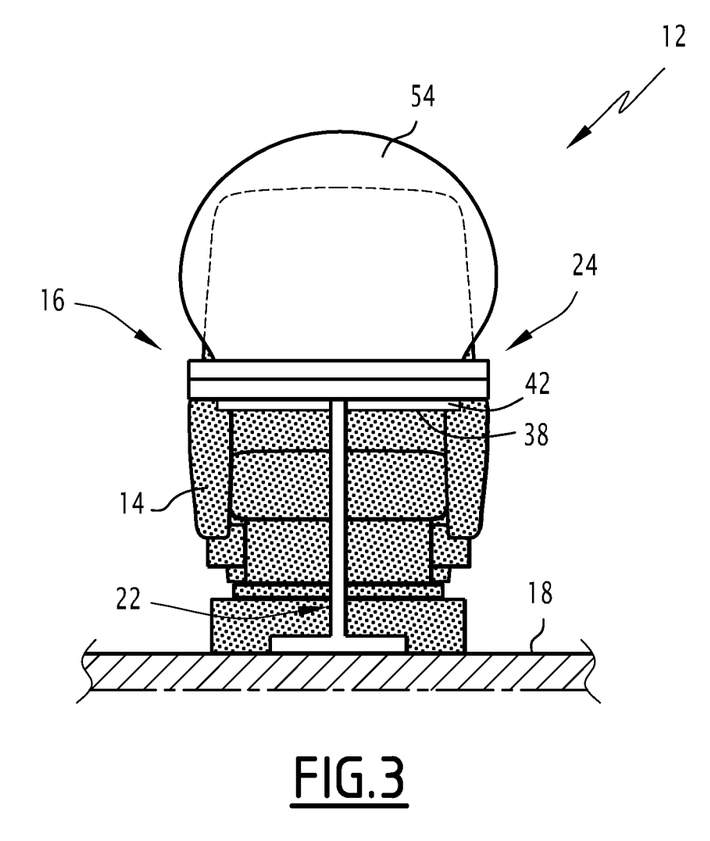
FIG. 3 is a partial cross-sectional front view of the cabin illustrated in FIG. 1, when the airbags are deployed.

The table 16 here comprises at least one leg 22 visible in FIG. 3, and a tray 24 supported by the leg 22. As schematically shown in FIG. 1, tray 24 is fixed on a sideledge 27 of the cabin 12.

The tray 24 includes a base 26 and at least one flap 28, in particular two flaps 28 articulated on the base 26.

Each flap 28 is mounted rotating on the base 26 about a horizontal axis A-A' shown in FIG. 1, located on a longitudinal edge of the base 26.

Each flap 28 is thus rotatable relative to the base 26, between a stowed configuration of the table 16, in which the flap 28 bears on the base 26, and a usage configuration of the table 16, in which at least one flap 28 is deployed so as to extend the base 26 of the table 16 longitudinally relative to the airplane.

In the usage configuration of the table 16, the base 26 has an upper surface 30 and a lower surface 32. Likewise, each flap 28 in the usage configuration has an upper face 34 and a lower face 36. In the stowed configuration of the table 16, the upper face 34 of each flap 28 thus faces the upper surface 30 of the base 26.

The table 16 further defines a housing 38 able to receive the safety device 40 according to the present disclosure. In this example, the housing 38 is located below the lower surface 32 of the base 26. The housing 38 is covered by a cover 55. In variants that will be described below, the position of this housing 38 is different.

Figure 4:
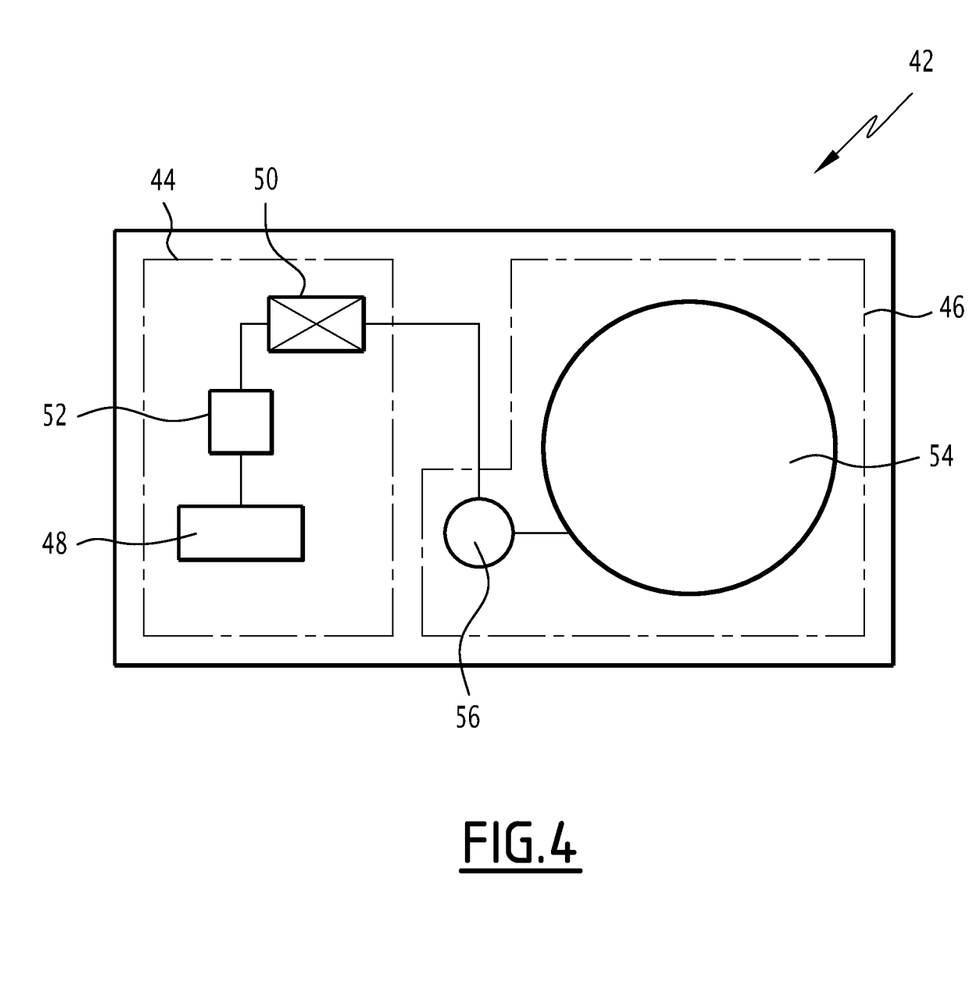
FIG. 4 is a schematic illustration of a first case of the safety device according to the present disclosure.

The safety device 40 according to the present disclosure comprises at least one case 42, visible in FIG. 4. The case 42 contains a control system 44 and a deployable protection assembly 46 able to be activated by the control system 44.

Figure 2:
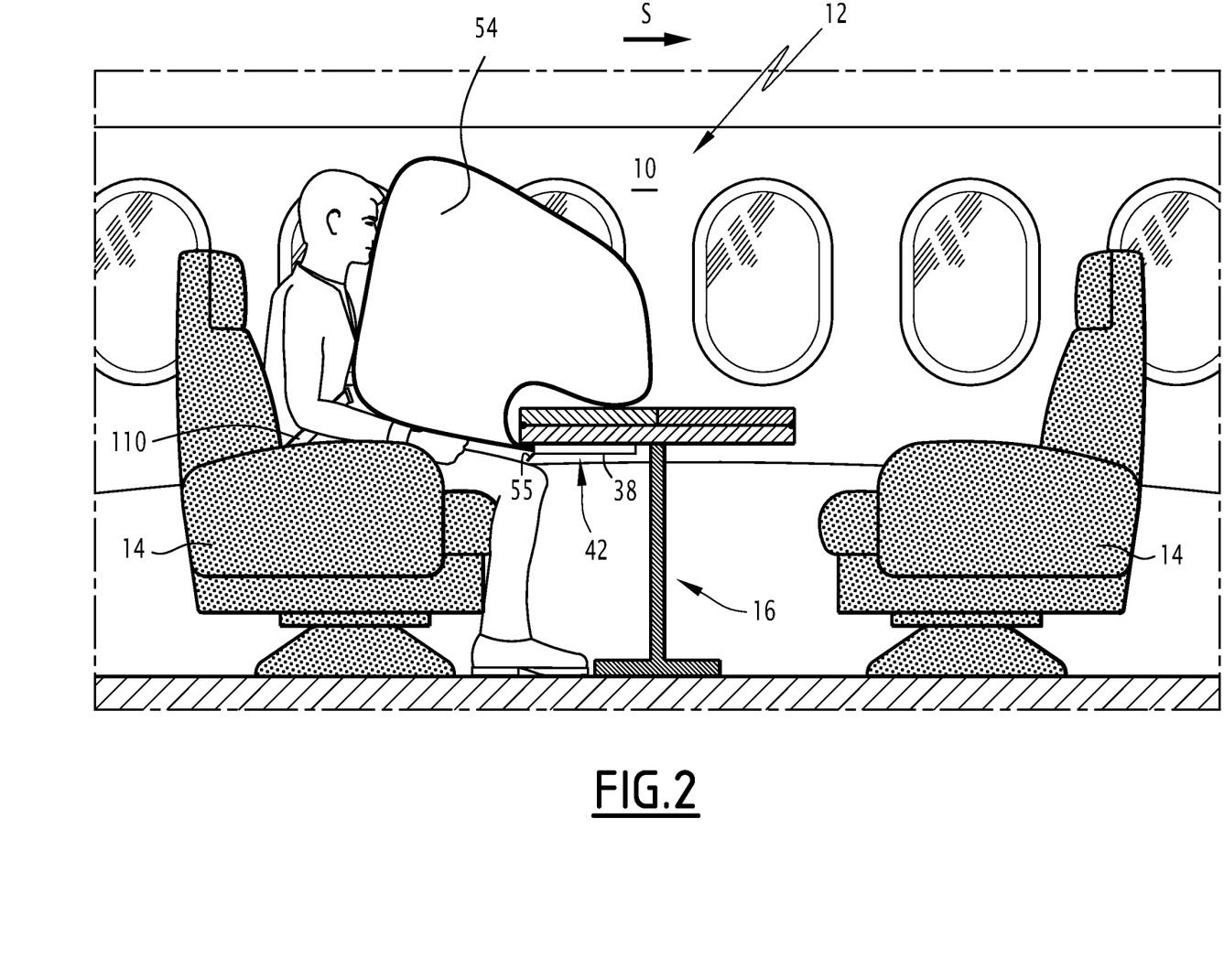
FIG. 2 is a view similar to FIG. 1, when the airbag is deployed.

In the example shown in FIG. 2, only the or each seat 14 oriented in the direction S is arranged opposite a safety device 40 containing a deployable protection assembly 46. No safety device 40 containing a deployable protection assembly 46 is arranged opposite the seats 14 oriented in the direction opposite the direction S.

The case 42 is connected to the tray 24 of the table 16 means of the housing 38 in which it is received.

The protection assembly 46 comprises an airbag 54 and an inflation system 56 for inflating the airbag 54.

The inflation system 56 is able to take the airbag 54 from an idle retracted configuration, in which the airbag 54 is folded in the case 42, to a deployed safety configuration, in which the airbag 54 is inflated by the inflation system 56.

In the deployed configuration, the airbag 54 extends over a zone facing the passenger 20 seated in the seat 14, as illustrated in FIG. 2. It in particular extends opposite the tray 24, above the tray 24, and advantageously below the tray 24, while protruding toward the seat 14 from the table 16.

The inflation system 56 advantageously comprises a pyrotechnic capsule, able to create a gas for inflating the airbag 54. In a variant, the inflation system 56 comprises a reserve of pressurized gas, able to fill the airbag 54 with a pressurized gas.

The control system 44 comprises a device 48 for detecting longitudinal deceleration, a battery 50 and a processor 52.

The detection device 48 detects the longitudinal deceleration during events involving a significant deceleration of the aircraft 10. This device 48 is advantageously an accelerometer.

During such events, the aircraft 10 acquires deceleration values that may reach up to 16 g or more.

When the deceleration value measured by the device 48 exceeds a predetermined threshold value, for example greater than 5 g, the airbags 54 are deployed.

This ensures the safety of the passenger 20 on board the aircraft 10, while avoiding the untimely deployment of the airbags 54 due to an insignificant impact below the threshold.

The processor 52 is able to receive the deceleration data measured by the detection device 48 and to analyze them. It is able to compare the values measured by the detection device 48 with the threshold deceleration value.

When the deceleration of the aircraft is greater than the threshold deceleration value, the processor 52 is able to activate the battery 50. The battery 50 then powers the inflation system 56, which fills the airbag 54 with gas.

Once the command is generated by the processor 52, the deployment of the airbag 54 by the inflation system 56 is very fast, with a duration of less than a hundred milliseconds, and in particular inclusively between 10 milliseconds and 90 milliseconds.

The cover 55 of the housing 38 is able to open under the effect of the pressure exerted by the airbag 54 on the cover 55 during the deployment of the airbag 54.

In this example, and as shown in FIG. 4, the case 42 contains all of the elements of the control system 44 and the protection assembly 46, in particular the detection device 48, the battery 50, the processor 52, the airbag 54 and the inflation system 56.

Equipping the aircraft 10 cabin 12 with a protection device 40 according to the present disclosure is therefore simple to do, and it is easy to maintain by simply disassembling or replacing the case 42.

A method for protecting a passenger 20 of an aircraft 10 in a cabin 12 according to the present disclosure, during a strong deceleration of the aircraft, will now be described.

The passenger 20 is initially seated in a seat 14 of the cabin 12. The table 16 is in the stowed configuration and the airbag 54 is in the retracted configuration.

When the aircraft 10 decelerates sharply, causing it to experience a deceleration exceeding the threshold value, the processor 52 reads and analyzes the deceleration value measured by the detection device 48. The deceleration value being above the threshold value, the processor 52 activates the battery 50. The battery 50 powers the inflation system 56, which deploys the airbag 54.

The airbag 54 inflates and then extends across from the passenger 20, opposite the tray 24, above the tray 24 and advantageously below the tray 24. It is inserted between the table 16 and the passenger 20 in order to absorb his movement and thus prevent the passenger 20 from strongly impacting an element of the table 16.

Indeed, if the body of the passenger 20 is driven toward the table 16 following the deceleration, he comes into contact with the airbag 54, rather than with the table 16.

Figure 5:
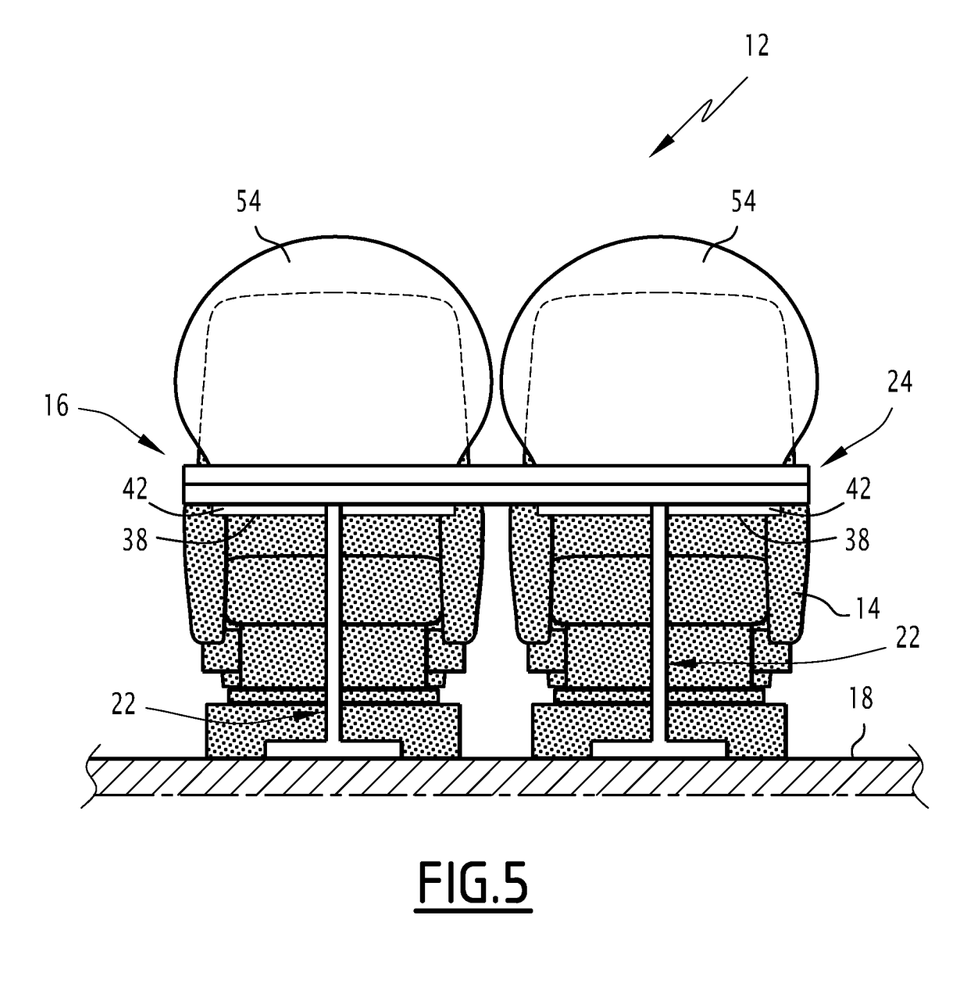
FIG. 5 is a view showing a variant of the cabin according to the present disclosure.

In the variant shown in FIG. 5, two seats 14 face a table 16. A case 42 is then mounted opposite each seat 14. The table 16 then has at least two housings 38 respectively opening out opposite each seat 14. An airbag 54 is therefore able to be deployed opposite each passenger 20 during an excessive deceleration of the aircraft 10.

In a variant, the seat 14 is able to accommodate several passengers 20 and a single case 42 is inserted into the table 16 in order to protect these passengers 20 using a single airbag 54 extending over the width of the seat 14.

Figure 6:
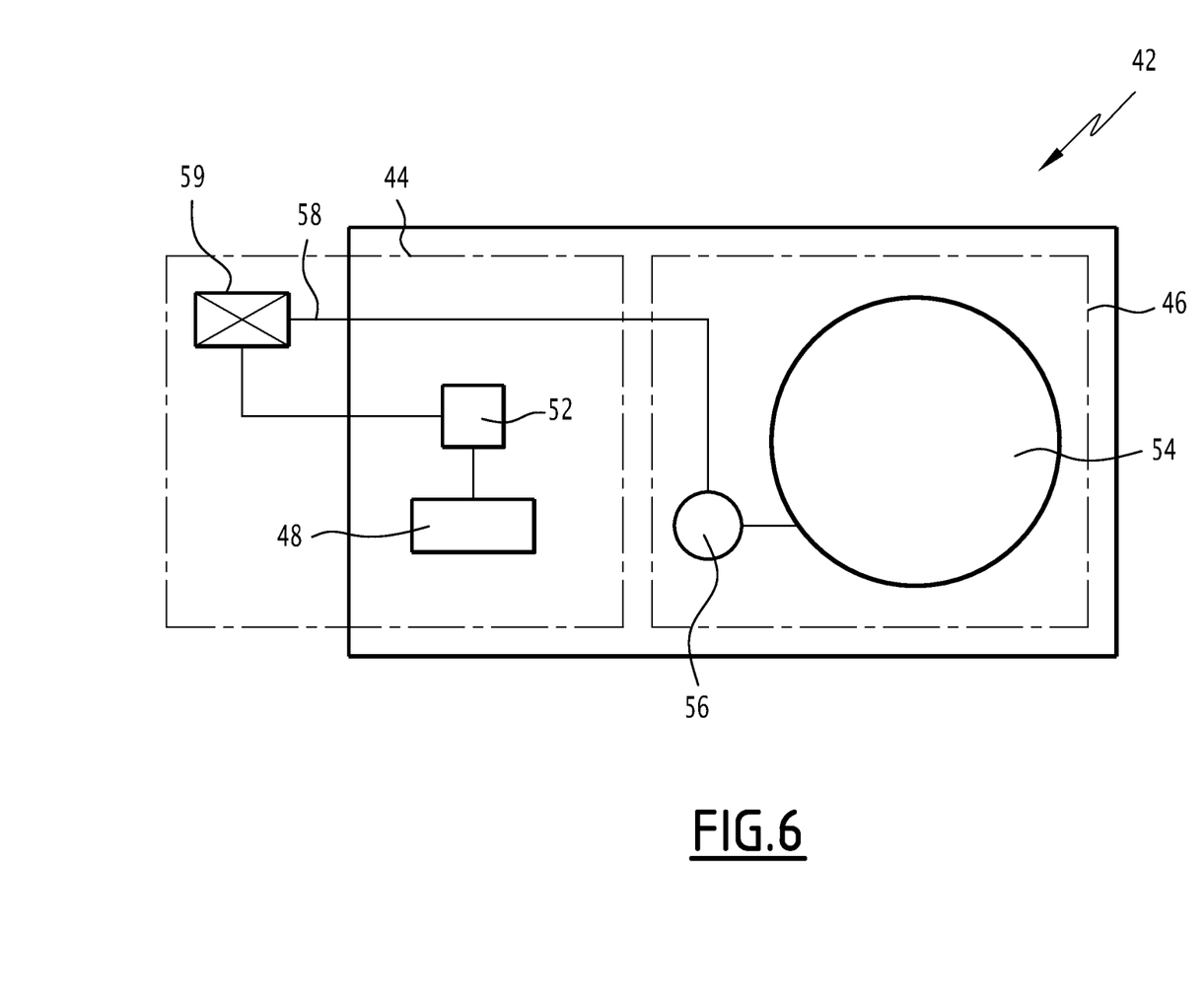
FIG. 6 illustrates a first variant of the case of the safety device according to the present disclosure, shown in FIG. 4.

In the variant shown in FIG. 6, the case 42 is supplied with energy by the aircraft 10 via at least one electrical connection 58. In this example, the case 42 has no battery 50, but is connected to an electrical supply system 59 of the aircraft 10.

Figure 7:
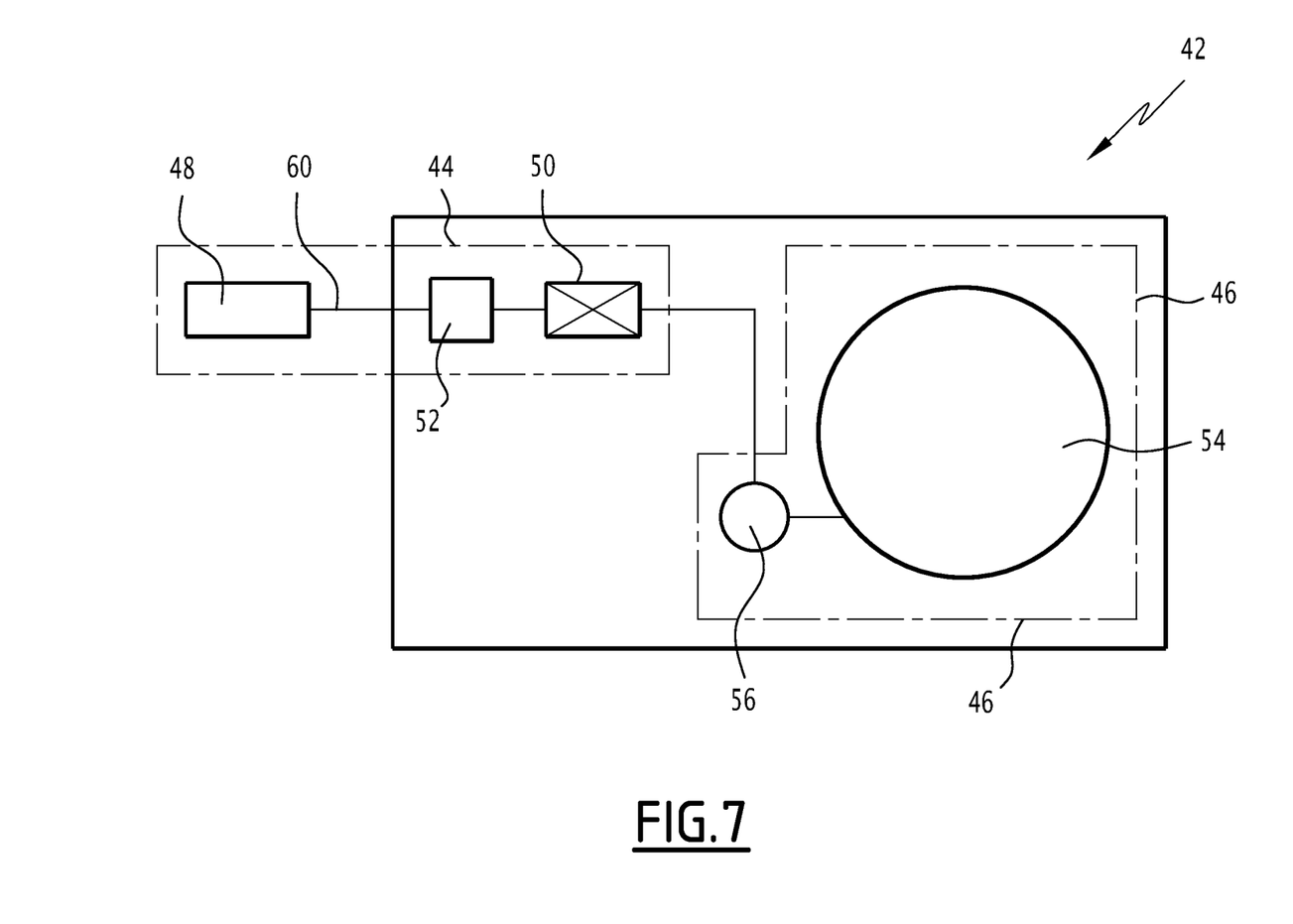
FIG. 7 illustrates a second variant of the case of the safety device according to the present disclosure, shown in FIG. 4.

In another example shown in FIG. 7, the detection device 48 is placed outside the case 42, in a rigid part of the aircraft 10, such as the floor 18. Thus, the measurement by the detection device 48 is not distorted by any deformations related to the deceleration. The detection device 48 is connected to the case 42 by means of a connection 60.

Figure 8:
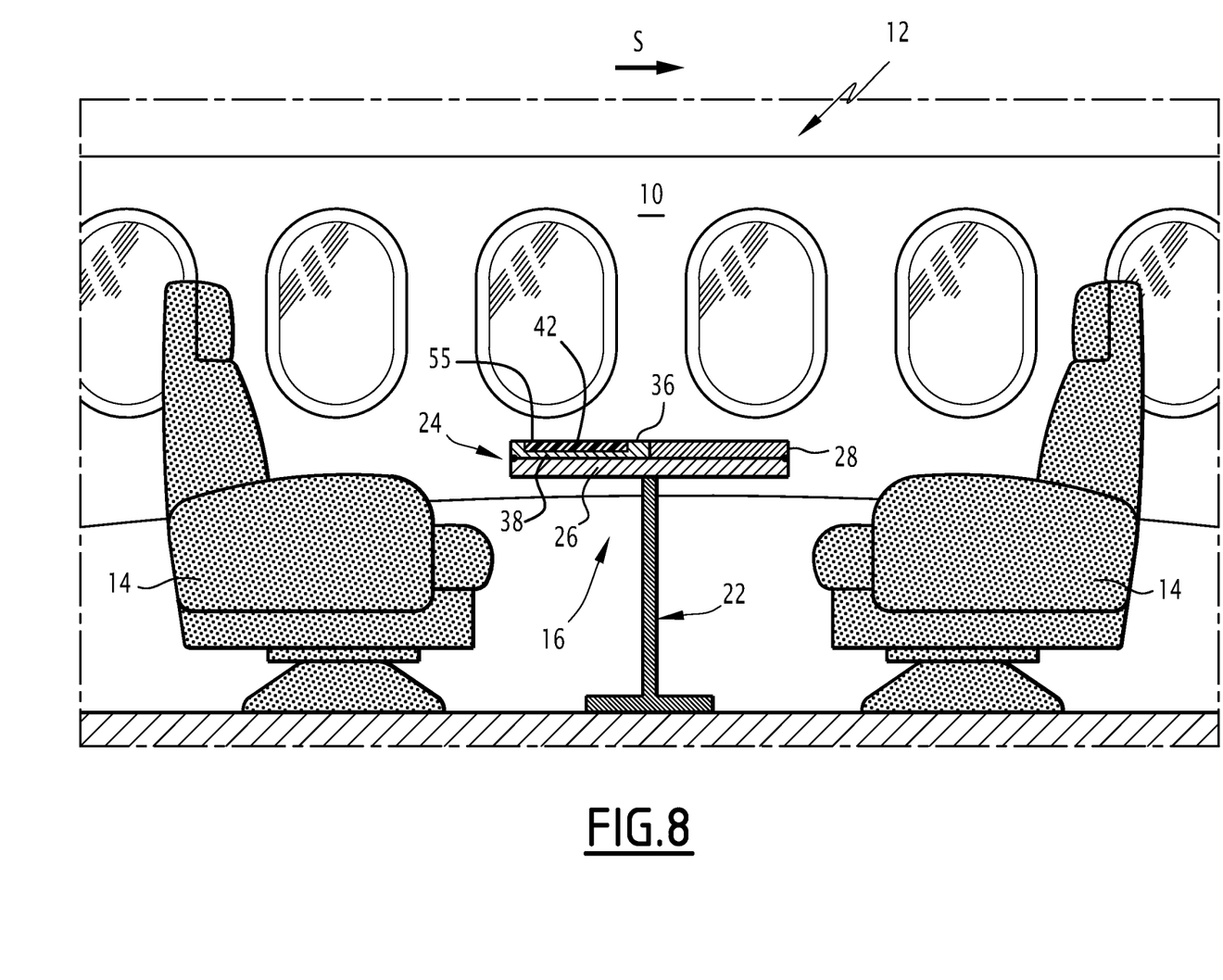
FIG. 8 illustrates another variant of an aircraft cabin according to the present disclosure.

The cabin 12 shown in FIG. 8 differs from that shown in FIG. 1 in that the case 42 is received in a housing 38 arranged in the thickness of the flap 28 of the table 16. The cover 55 of the housing 38 defines a part of the lower surface 36 of the flap 28 in which the housing 38 is arranged.

During the deployment of the airbag 54, the cover 55 opens and the airbag 54 is deployed above the tray 24 of the table 16, and toward the passenger of the seat 14 that it protects.

Figure 9:
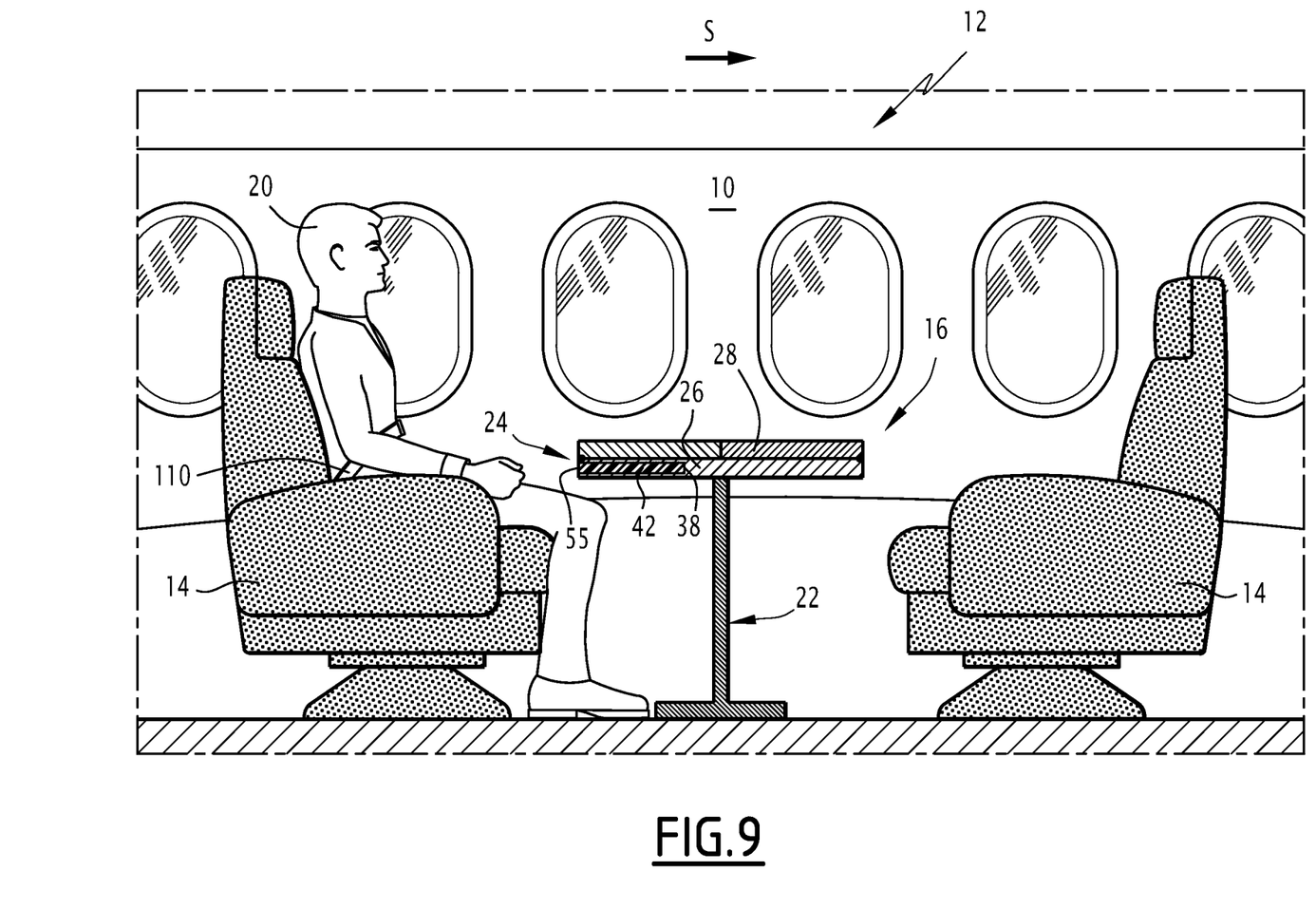
FIG. 9 illustrates another variant of an aircraft cabin according to the present disclosure.

In the example shown in FIG. 9, the case 42 is inserted into a housing 38 arranged in the thickness of the base 26 of the table 16.

The cover 55 of the housing 38 defines part of the edge of the base 26 of the table 16.

During the deployment of the airbag 54, the cover 55 opens and the airbag 54 is deployed below the tray 24 of the table 16, then toward the passenger of the seat 14 that it protects, and next above the tray 24.

Figure 10:
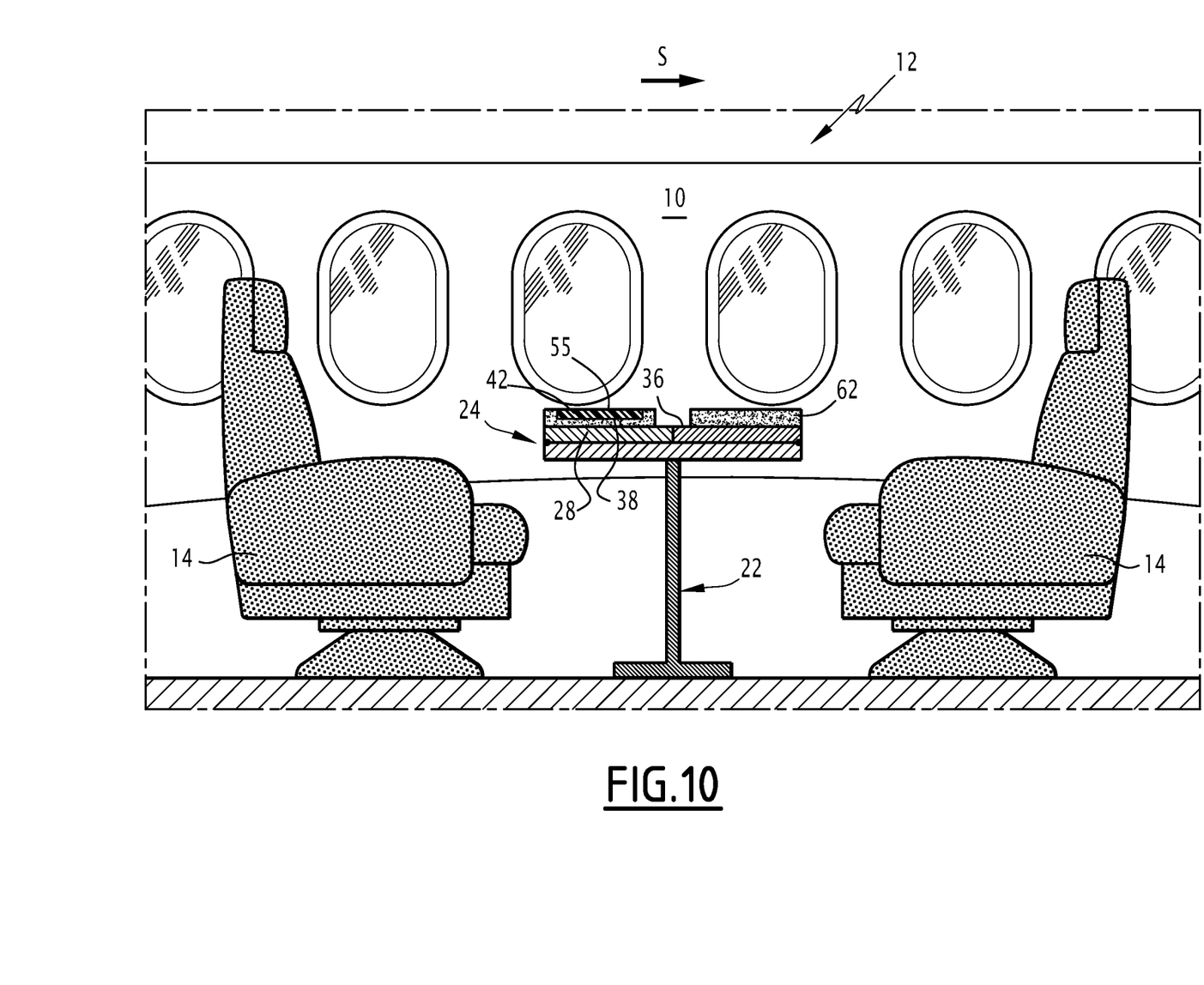
FIG. 10 illustrates another variant of an aircraft cabin according to the present disclosure.

The cabin 12 shown in FIG. 10 differs from that shown in FIG. 1 in that the lower face 36 of each flap 28 is equipped with a foam covering 62.

The case 42 is inserted into a housing 38 arranged in the thickness of the foam covering 62 of a flap 28.

During the deployment of the airbag 54, the cover 55 opens and the airbag 54 is deployed above the tray 24 of the table 16, then in the direction of the passenger of the seat 14 that it protects.

Figure 11:
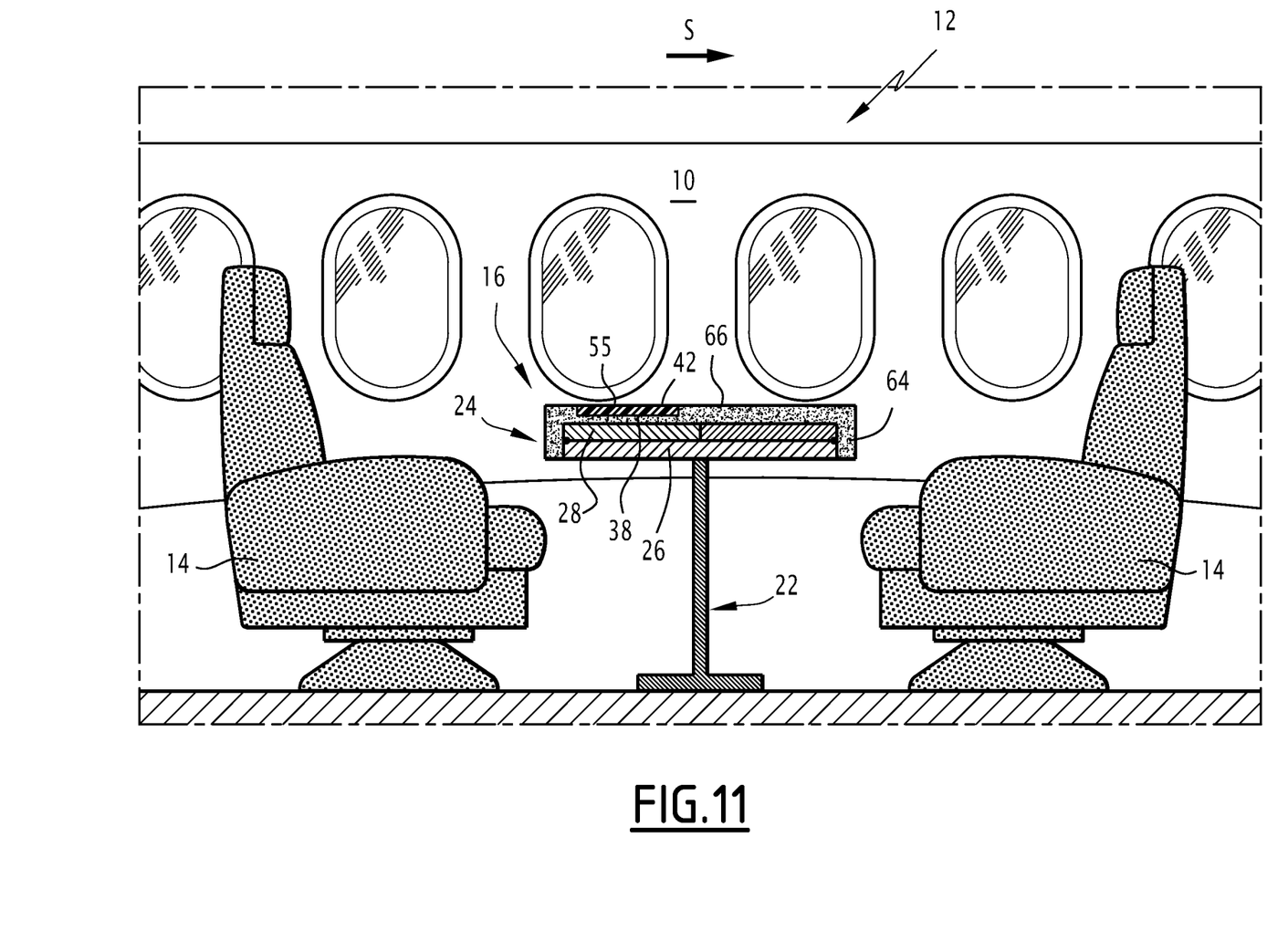
FIG. 11 illustrates another variant of an aircraft cabin according to the present disclosure.

The cabin 12 shown in FIG. 11 differs from that shown in FIG. 1 in that the safety device 40 includes a removable protection pad 64 able to be mounted on the table 16.

A case 42 is inserted into a housing 38 arranged in the thickness of the protection pad 64.

The cover 55 of the housing 38 defines part of the upper surface 66 of the protection pad 64. During the deployment of the airbag 54, the cover 55 opens and the airbag 54 is deployed above the tray 24 of the table 16, and advantageously in the direction of the seat 14 that it protects.

Figure 12:
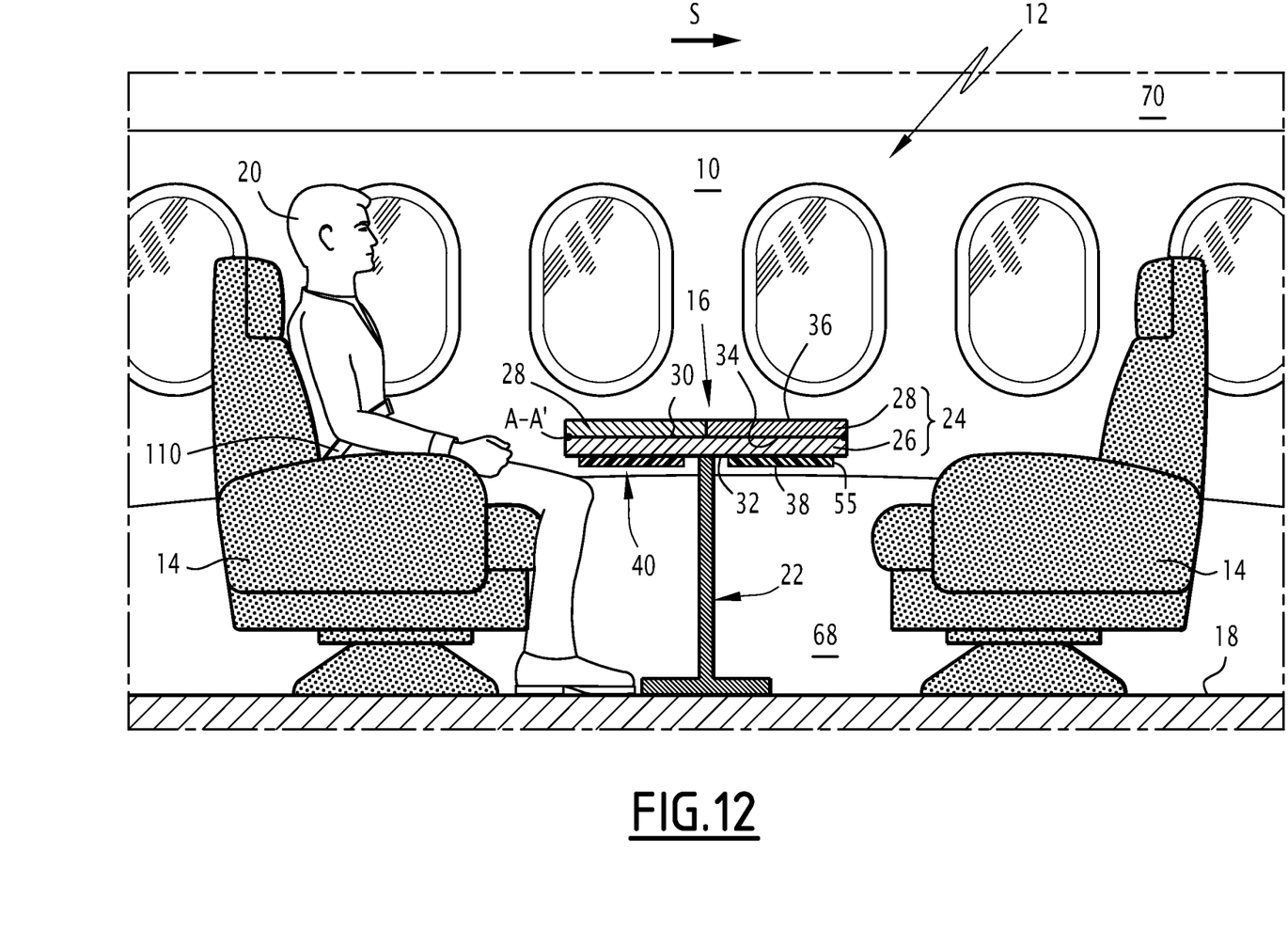
FIG. 12 illustrates another variant of an aircraft cabin according to the present disclosure.
Figure 13:
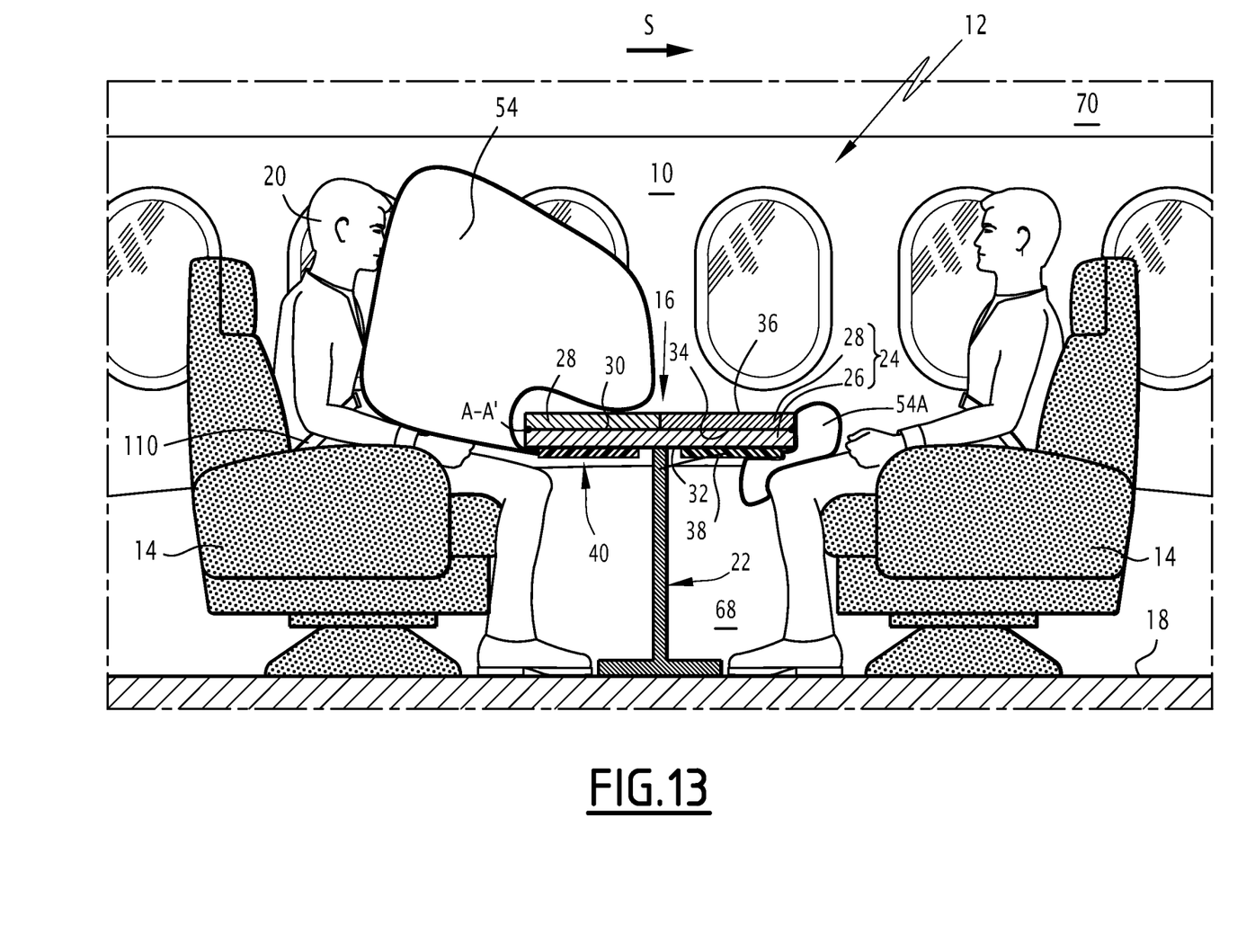
FIG. 13 is a view similar to FIG. 12, when the airbags are deployed.

The cabin 12 shown in FIGS. 12 and 13 differs from that shown in FIG. 1 in that a safety device 40 including a case 42 containing a second airbag 54A is further arranged opposite a seat 14 located in the direction opposite the direction S.

In this example, each case 42 is inserted into a housing 38 arranged in each flap 28 of the table 16. In variants that are not shown, the cases 42 are inserted into housings 38 arranged in the base 26, or in the foam covering 62, or in a protection pad 64.

As shown in FIG. 13, during the deployment of the first airbag 54 contained in a case facing a seat 14 oriented in the direction S, the first airbag 54 is advantageously deployed above the tray 24 of the table 16, then in the direction of the torso and the face of the passenger 20 located in the seat 14 that it protects.

In addition, during the deployment of the second airbag 54A contained in a case 42 facing a seat 14 oriented in the direction opposite the direction S, the second airbag 54A is advantageously deployed below the table 16, in the direction of the lower limbs of the passenger 20, so as to prevent the contact of the table 16 with the lower limbs of the passenger 20, in particular in case of deformation of the table 16 as a result of the sharp deceleration.

In a variant that is not shown, at least one additional case 42 is inserted into a housing 38 arranged in the sideledge 68 of the cabin 12, in a window panel, and/or in a valence panel 70 of the cabin 12. The airbag 54 is deployed in the direction of the neighboring seat 14, so as to protect the torso and/or the head of the passenger 20 occupying the seat 14 in addition to the airbag 54 connected to the table 16.

Owing to the present disclosure just described, it is possible to have an aircraft 10 cabin 12 layout including a safety device 40 effectively protecting a passenger 20 seated inside the cabin 12 in a seat 14 arranged opposite a table 16.

Additionally, it is possible to certify seats 14 facing a table 16, the seats 14 being equipped only with seatbelts 110 with no shoulder strap, which improves the comfort of the passenger without detriment to his safety.

This also allows substantial weight savings on the backrests of the seats 14 in the direction S of travel of the airplane, which in fact no longer need to be reinforced.

The safety device 40 automatically ensures the safety of the passenger 20 in the high position of the table 16. This protection is present for the entire duration of the flight, without the crew having to perform complex and tedious manipulations, while minimizing the space occupied. The safety device 40 also adapts easily to any changes in the architecture of the cabin 12, in particular the evolution of the seats 14 of the cabin 12, in order to obtain a faster certification.

As shown in the figures, in the cabin 12, the table 16 is a dining or/and working table, which is kept in in a plane parallel to the cabin floor at all times, unlike a tray table, which is mounted pivoting behind a seat. A tray table cannot be used at all times, since it must be stowed in a vertical position against the back of a seat during the taxi, takeoff and landing phases ("TTOL: Taxi Take Off Landing").

Advantageously, the table 16 is maintained in the high position (in a plane parallel to the cabin floor at all times) throughout the entire duration of the flight, in particular during the taxi, takeoff and landing phases of the airplane ("TTOL: Taxi Take Off Landing"). The table is thus able to be used in all phases of the flight, while providing passenger safety, without modification of its configuration for the taxi, takeoff and landing phases of the aircraft.

As visible in particular in FIGS. 1 to 5 and 8 to 13, the table 16 has a tray 24 that includes a base 26 extending at all times in a plane parallel to a floor of the cabin, the plane of the base 26 being horizontal when the longitudinal axis of the aircraft 10 is horizontal.

In the high position shown in these figures, the base 26 of the tray 24 extends above and away from the floor 18 of the cabin.

In the example shown in the preceding figures, the tray 24 of the table 16 is supported by at least one leg 22.

In a variant, the tray 24 of the table 16 is kept in a high position by its fastening to a sideledge of the cabin 12 extending along the fuselage.

What is claimed is:

1. An aircraft cabin comprising:
    at least one seat configured to receive at least one passenger;
    at least one table arranged opposite the seat; and
    a safety device configured to be mounted on the table, below the table or received in the table, the safety device including:
        at least one airbag, the at least one airbag being deployable from a retracted idle configuration to a deployed safety configuration of the at least one passenger seated on the seat, and
        a controller configured to control the deployment of the at least one airbag, and to trigger the deployment of the at least one airbag beyond a threshold deceleration value of the aircraft,
    the table being a dining table which comprises a tray, the tray comprising at least one base extending at all times in a plane parallel to a cabin floor,
    wherein the at least one airbag is mounted on the tray or received in the tray,
    wherein the tray comprises a base and at least one flap that is movable relative to the base between a stowed configuration in which the flap is folded on the base and a usage configuration in which the flap is deployed in the extension of the base.

2. The aircraft cabin according to claim 1, wherein the at least one airbag is received in a thickness of the tray of the table.

3. The aircraft cabin according to claim 1, wherein the at least one airbag is mounted below the tray of the table.

4. The aircraft cabin according to claim 1, wherein the at least one airbag is received in a thickness of the flap of the table.

5. The aircraft cabin according to claim 1, wherein the flap comprises a foam covering fixed on the flap, the at least one airbag being received in the foam covering.

6. The aircraft cabin according to claim 1, wherein the safety device includes a removable protection pad configured to be mounted on the table, the at least one airbag being received in the protection pad.

7. The aircraft cabin according to claim 1, wherein the at least one seat includes a first seat oriented facing the front of the aircraft, the at least one airbag comprising a first airbag mounted facing the first seat, the first airbag deploying above the table in order to protect a torso and a head of a passenger seated in the first seat, and/or
the at least one seat comprising a second seat oriented facing the rear of the aircraft, the at least one airbag comprising a second airbag facing the second seat, the second airbag deploying below the table to protect lower limbs of a passenger seated in the second seat.

8. The aircraft cabin according to claim 1, wherein the table defines or bears a housing for receiving the safety device and includes a cover for closing the housing, the cover defining part of an outer surface of the table.

9. The aircraft cabin according to claim 1, wherein the safety device includes a case receiving the at least one airbag and an inflater configured to inflate the airbag.

10. The aircraft cabin according to claim 9, wherein the controller includes a battery configured to supply electricity to the inflater or wherein the controller includes an electricity supply connection connected to an electrical supply of the aircraft and to the inflater.

11. The aircraft cabin according to claim 9, wherein the controller controlling the deployment of the at least one airbag is received in the case.

12. The aircraft cabin according to claim 1, wherein the controller includes a deceleration detector and a processor configured to analyze deceleration measurements taken by the detector in order to activate a deployment of the at least one airbag when the deceleration measured by the detector is above the threshold value.

13. The aircraft cabin according to claim 1, wherein the table is arranged with no direct mechanical connection with a seat opposite which the table is arranged.

14. The aircraft cabin according to claim 1, wherein the table comprises at least one leg and a tray supported by the at least one leg.

15. A method for protecting a passenger of an aircraft comprising:
installing at least one passenger in a seat of the aircraft cabin according to claim 1;
detecting, via the controller, a deceleration of the aircraft exceeding a threshold deceleration value;
deploying the at least one airbag in a space opposite the at least one passenger, between the seat and the table.

16. The method according to claim 15, comprising keeping the table in a plane parallel to the cabin floor at all times.

17. The method according to claim 15, comprising keeping the table in a high position throughout during taxi, takeoff and landing phases of the aircraft.

18. An aircraft cabin comprising:
at least one seat configured to receive at least one passenger;
at least one table arranged opposite the seat; and
a safety device configured to be mounted on the table, below the table or received in the table, the safety device including:
at least one airbag, the at least one airbag being deployable from a retracted idle configuration to a deployed safety configuration of the at least one passenger seated on the seat, and
a controller configured to control the deployment of the at least one airbag, and to trigger the deployment of the at least one airbag beyond a threshold deceleration value of the aircraft,
wherein the at least one seat includes a first seat oriented facing the front of the aircraft, the at least one airbag comprising a first airbag mounted facing the first seat, the first airbag deploying above the table in order to protect a torso and a head of a passenger seated in the first seat, the at least one seat comprising a second seat oriented facing the rear of the aircraft, the at least one airbag comprising a second airbag facing the second seat, the second airbag deploying below the table to protect lower limbs of a passenger seated in the second seat.

19. The aircraft cabin according to claim 18, wherein the table has a forward facing edge and a rear facing edge, the rear facing edge being configured to be covered by the first airbag deploying above the table, the forward facing edge being configured to be covered by the second airbag deploying below the table.

* * * * *

UNITED STATES PATENT AND TRADEMARK OFFICE
CERTIFICATE OF CORRECTION

| | | |
|---|---|---|
| PATENT NO. | : 11,851,183 B2 | Page 1 of 1 |
| APPLICATION NO. | : 17/077684 | |
| DATED | : December 26, 2023 | |
| INVENTOR(S) | : Lionel Germe et al. | |

It is certified that error appears in the above-identified patent and that said Letters Patent is hereby corrected as shown below:

On the Title Page

Item (72) The name of the first listed inventor is incorrect and should be changed from "Lionel Patrick Germe" to "Lionel Germe."

Signed and Sealed this
Thirtieth Day of December, 2025

John A. Squires
*Director of the United States Patent and Trademark Office*